April 29, 1952 — L. C. GARBY — 2,595,192
CONTROL SURFACE FOR AIRPLANES
Filed Nov. 23, 1945 — 2 SHEETS—SHEET 1
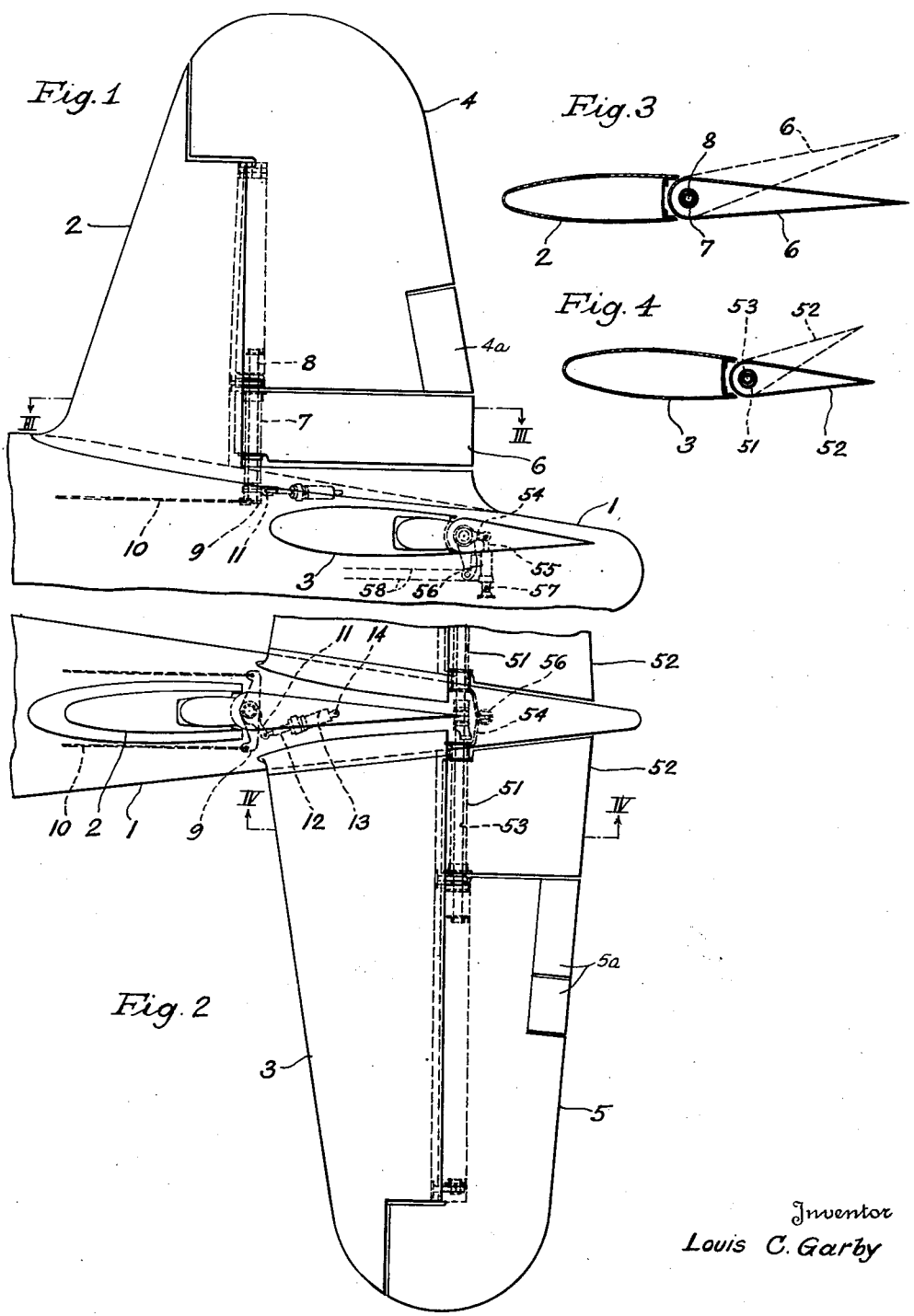
Inventor
Louis C. Garby
By H. H. Oldham
Attorney April 29, 1952 L. C. GARBY 2,595,192
CONTROL SURFACE FOR AIRPLANES
Filed Nov. 23, 1945 2 SHEETS—SHEET 2
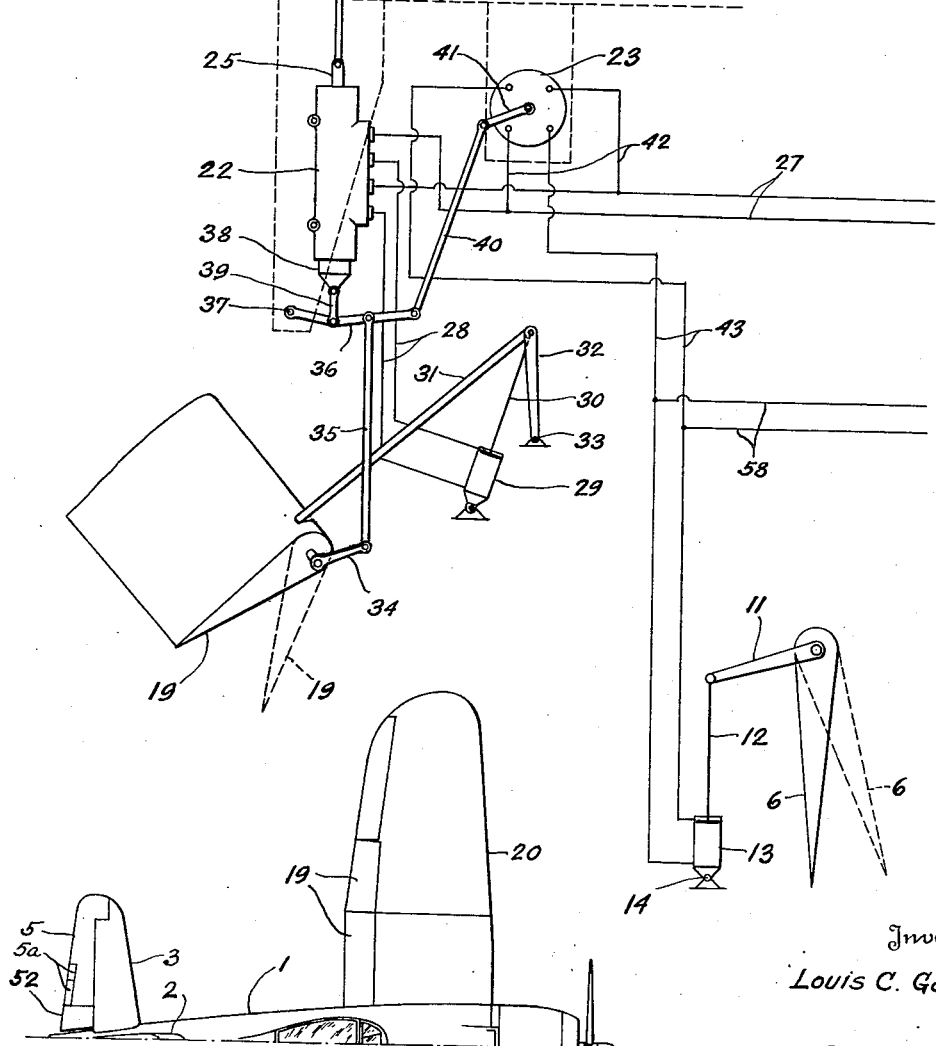
Inventor
Louis C. Garby Patented Apr. 29, 1952

2,595,192

UNITED STATES PATENT OFFICE 2,595,192

CONTROL SURFACE FOR AIRPLANES

Louis C. Garby, Akron, Ohio, assignor to Goodyear Aircraft Corporation, Akron, Ohio, a corporation of Delaware Application November 23, 1945, Serial No. 630,191

4 Claims. (Cl. 244—87)

This invention relates to the construction of airplanes and particularly to that of the control surfaces thereof.

Heretofore it has been known to provide airplanes with rudders and elevators to which were attached torque balance tabs for easier operation. However, with high-speed airplanes the rudders and elevators, sufficiently large under normal flying conditions, become too small for starting operations, especially on limited space, as on an aircraft carrier, and also in case of an intended carrier landing which is waved-off and the already slowed-down plane must rapidly gather speed and turn away. That is particularly the case with an unbalanced engine torque and with the slip stream of a propeller acting with unequal force upon the two sides of the rudder stabilizing surface and of the rudder. These unbalanced forces have the tendency to deviate the airplane from a straight flight course, and this tendency must be corrected by the rudder, which, therefore, requires a greater surface. However, it must be kept in mind that by simply increasing the rudder it would be larger than necessary for operating it in full flight.

Similarly, provision may be made for the elevators to assist in compensating the moment due to wing flap deflection, as well as, the moment resulting from the ground deflection of the wing down wash against the horizontal stabilizer.

It is, therefore, the general object of the invention to avoid and to overcome the foregoing and other difficulties of and objections to prior art practices by the provision of auxiliary controlling means operable independently of and to assist the main control surfaces under given conditions.

Another object of this invention is to provide auxiliary means to assist the main rudder action when the wing flaps and the landing gear are in down position.

Another object of the invention is to automatically operate auxiliary rudder means after the wing flaps have been turned down a certain angle.

Another object of the invention is to automatically operate the auxiliary elevator means for assisting the main elevators after the wing flaps have been turned down a certain angle.

The aforesaid objects of the invention and other objects which will become apparent as the description proceeds are achieved by adding auxiliary control surface to the main rudder surface and also, if necessary, to each main elevator surface. These auxiliary surfaces are actuated entirely independently from the main control surfaces and are operated only when the wing flaps and the landing gear are already in down position. However, the auxiliary rudder needs to be deflected in only one direction to balance the unsymmetrical effect of the engine torque and of the propeller slip stream acting upon the stabilizing surface and upon the main rudder. Usually the angle of deflection of the auxiliary rudder is fixed. Likewise, auxiliary elevator surfaces are deflected only upwardly to assist the main elevators in keeping the tail end of the airplane down. Generally the auxiliary control surfaces are actuated hydraulically in such a way that they are controlled by valves in the pressure system which also control the movement of the airplane wing flaps and landing gear (not shown). After the wing flaps have been deflected a certain angle, usually about 20°, the flap selection valve, being set for the flap deflection desired, admits pressure fluid in the hydraulic cylinders actuating the auxiliary control surfaces. Under ordinary flight conditions the auxiliary control surfaces are in neutral position and function as stabilizers. Of course, the operation of the auxiliary control surfaces is not restricted to a hydraulic pressure system, but may be operated electrically, pneumatically, or by any suitable means.

For a better understanding of the invention reference should be had to the accompanying drawings, wherein:

Fig. 1 is a side view of an airplane empennage; Fig. 2 is a fragmentary top view of Fig. 1; Fig. 3 is a cross-sectional view taken on line III—III of Fig. 1; Fig. 4 is a cross-sectional view taken on line IV—IV of Fig. 2; Fig. 5 illustrates diagrammatically, partly in perspective view, the control means for the wing flaps and the auxiliary rudder; and Fig. 6 is a plan view showing one-half of an airplane.

With specific reference to the form of the invention illustrated in the drawings the numeral 1 indicates the rear end of an airplane fuselage to which are immovably attached vertical and horizontal stabilizing surfaces 2 and 3, respectively, at the rear ends of which are mounted in conventional manner the rudder surface 4 and the elevator surfaces 5, respectively. In conventional manner, the rudder surface 4 is provided with the usual trim tab 4a and the elevator surfaces with trim tabs 5a, such trim tabs 4a and 5a being controlled in well known and conventional manner. An auxiliary rudder control surface 6 provided with a hollow shaft 7, is made fully swingable about the main rudder shaft 8 extending from the lower end of the main rudder and being fixed thereto. The main rudder 4 is operated in the usual way by a double lever 9 attached to the free end of the shaft 8 and connected by cables 10 leading to the foot levers in the cock pit (not shown), whereas the auxiliary rudder is operated by a lever 11 pivotally connected to the piston rod 12 of the hydraulic cylinder 13 swingable about a pivot 14 in fixed position. For operating the auxiliary rudder 6, which from its neutral position, as shown in full lines (Fig. 3), is deflected in only one direction, as shown in dotted lines, to counteract the propeller torque and the unequal forces of the propeller slip stream acting upon both sides of the rudder stabilizer 2 and main rudder 4, the cylinder 13 is hydraulically connected to a control system which also controls the movement of the flaps 19 of the wings 20 and which may be deflected from their zero position downwardly any desired angle.

As diagrammatically illustrated in Fig. 5, this control system of known construction includes a flap control device 21 provided with a graduation of the flap deflection angles in degrees, a flap deflection selector valve 22, and an auxiliary rudder control valve 23, which also may serve to control the landing gear movement and other movable devices operated in conjunction with the wing flaps. These parts, except the flap control device 21 are usually mounted underneath the cockpit floor and are mechanically connected with each other as well as with the wing flaps. For operating the wing flaps 19 and the auxiliary rudder surface 6 the lever 24 of the flap control device 21 is moved to a mark on this device which indicates the angle to which the flaps are to be deflected. Thereby the plunger 25 of the flap selector valve 22 is set to open fluid ports by means of a link 26 pivoted to the lever 24 and to the plunger 25. The valve 22 which is hydraulically connected by a pressure line and a return line 27 with a pressure source, not shown, then admits pressure fluid through the aforesaid fluid ports and through one of the lines 28 into the hydraulic cylinder 29. By moving the piston and piston rod 30, the liquid at the other end of the cylinder is returned to the valve 22 and through the return line 27 to the pressure source. Thereby, the flaps 19, linked by a rod 31 with the ends of the piston rod 30 and the lever 32 swingable about a pivot 33 in fixed position, are deflected downwardly the desired angle from the position shown in solid lines to the position shown in dotted lines. Simultaneously the lever 34 attached to the flaps 19 and pivotally connected to the rod 35 which in turn is pivotally connected to the lever 36 swingable about a pivot 37 in fixed position, causes to move the plunger 38 in the bottom of the selector valve 22 inwardly by means of a link 39 until it closes the ports opened by the positioning of plunger 25 as moved by lever 24 to stop further fluid flow into the operating cylinder 29, and, accordingly, further movement of the flaps. However, by the upward movement of the lever 36 which is also linked at its free end by a rod 40 with the lever 41 of the auxiliary rudder control valve 23, this valve is operated. The valve 23, which is also hydraulically connected by a pair of lines 42 with the pressure source and by a pair of lines 43 with the operating cylinder 13 of the auxiliary rudder surface, is so constructed that it will not open until the flaps are already deflected about 20°. During the deflection of the auxiliary rudder surface, the amount of which is fixed by the length of its operating cylinder, the flaps will further deflect until the amount predetermined by the setting of the lever 24 is reached. By setting the lever 24 for a deflection of the flaps of less than approximately 20° the auxiliary rudder surface 6, which is operatively connected by the lever 11 with the piston and piston rod of the operating cylinder 13, will remain stationary.

Although the invention so far has been described in connection with an auxiliary rudder, its control system can be used without change for operating auxiliary elevator surfaces by simply branching off the fluid lines 43 leading to operating cylinders for the auxiliary elevator surfaces, provided such are desired.

In this case, as shown in Figs. 1, 2 and 4, the hollow shafts 51 of the auxiliary elevator surfaces 52 which swing about shafts 53 of the conventionally operated main elevators have attached to their inner ends a common forked lever 54 to which is pivotally connected the piston rod 55 movable in the hydraulic cylinder 56 swingable about a pin 57 in fixed position. This cylinder is connected by a pair of fluid lines 58 with the fluid lines 43 for simultaneous operation of the auxiliary rudder and the auxiliary elevators. The auxiliary control surfaces are moved slowly from their neutral position to their deflected fixed position where they remain until the flow of pressure in the operating cylinders is reversed, that is, when the flaps 19 are returned to their normal position. This is accomplished by moving the control lever 24 back to its zero position, whereby the plunger 25 of the flap deflection selector valve causes the pressure to be reversed in the lines 28 leading to the operating cylinder 29. Consequently, the flap 19 is returned to its neutral position with the result that plunger 38 of the selector valve is pushed back and, thereby, the movement of lever 41 of the rudder control valve causes reversal of the pressure in the cylinder 56, and, accordingly, the return of the auxiliary control surfaces to their neutral position.

It will be recognized that the objects of the invention have been achieved by supplementing the rudder and elevator surfaces, respectively, by auxiliary control surfaces which are operated independently therefrom at low flying speed, that is at a start and landing of an airplane when the landing wheels and the wing flaps are in down position.

Instead of operating the auxiliary rudder by actuating the wing flaps, other ways may be employed, for instance, by connecting it with the landing gear structure which when dropped automatically deflects the auxiliary control surfaces.

While in accordance with the patent statutes one best known embodiment of the invention has been illustrated and described in detail, it is to be particularly understood that the invention is not limited thereto or thereby, but that the inventive scope is defined in the appended claims.

I claim:

1. In an airplane a fuselage, supporting wings provided with flaps, a fixed vertical stabilizing fin adjacent the rear end of the fuselage, a main rudder having a trim tab, an auxiliary rudder positioned between the fuselage and the main rudder, the main rudder and the auxiliary rudder being hinged about substantially the same substantially vertical axis to the fin and movable independently of each other, and control means connecting said wing flaps with said auxiliary rudder to deflect it, only when the wing flaps are down.

2. In an airplane, a fuselage, supporting wings provided with flaps, a vertical stabilizing fin adjacent the rear end of the fuselage, a main rudder including a trim tab hinged to said fin and being operable at all flight conditions, an auxiliary rudder in fixed position during regular flight being disposed between the fuselage and the main rudder and hinged about the same axis as the main rudder, and a control operatively connecting said wing flaps and the auxiliary rudder for deflecting the auxiliary rudder after the flaps have been deflected a predetermined angle for a take-off and for a landing wave-off operation.

3. In an airplane a fuselage, supporting wings provided with flaps, a vertical stabilizing fin, a pair of horizontal stabilizing fins, a main control surface hinged to each of said fins, a trim tab hinged to each main control surface, an auxiliary control surface positioned between the fuselage and each of said main control surfaces and being turnable independently of the main control surface substantially about the same axis, and hydraulic-mechanical control means connecting the wing flaps with said auxiliary control surfaces to render them movable only after the wing flaps have been turned down an angle of about 20 degrees for a take-off and for a landing wave-off operation.

4. In an airplane, a fuselage, a fixed vertical stabilizing fin mounted adjacent the rear of the fuselage, a relatively large area control rudder pivotally mounted at the rear of the fin for movement about a substantially vertical axis, a trim tab on the rudder, said rudder having its lower edge terminating in substantially spaced parallel relation to the fuselage, an auxiliary rudder pivotally mounted for movement about the same axis as the main rudder and positioned between the fuselage and the lower edge of the main rudder and extending rearwardly substantially the same distance as the main rudder, wing flaps, hydraulic pressure means, a linkage connecting the flaps with the pressure means to effect movement of the flaps, a second fluid pressure means for controlling the position of the auxiliary rudder, a valve controlling the flow of fluid pressure to said second pressure means, and means connecting the linkage and the valve to progressively open the valve upon movement of the flaps towards operative position.

LOUIS C. GARBY.

REFERENCES CITED

The following references are of record in the file of this patent:

UNITED STATES PATENTS

| Number | Name | Date |
| --- | --- | --- |
| 1,367,840 | Tarbox | Feb. 8, 1921 |
| 1,862,902 | McDonnell | June 14, 1932 |
| 2,057,877 | Bragunier | Oct. 20, 1936 |
| 2,125,361 | Schwarzler | Aug. 2, 1938 |
| 2,167,533 | Solomon | July 25, 1949 |
| 2,303,695 | Johnson | Dec. 1, 1942 |
| 2,379,355 | Hodgdon | June 26, 1945 |

FOREIGN PATENTS

| Number | Country | Date |
| --- | --- | --- |
| 131,044 | Great Britain | Aug. 21, 1919 |
| 504,788 | Great Britain | Apr. 27, 1939 |